US00RE51053E

(19) United States
(12) Reissued Patent
Fu et al.

(10) Patent Number: US RE51,053 E
(45) Date of Reissued Patent: Oct. 6, 2026

(54) WATER HEATER HAVING HIGHLY EFFICIENT AND COMPACT HEAT EXCHANGER

(71) Applicant: A. O. SMITH CORPORATION, Milwaukee, WI (US)

(72) Inventors: Ziwen Fu, Nanjing (CN); Jun Xiao, Nanjing (CN); Yonghua Cheng, Fergus (CA); Tingyu Li, Nanjing (CN); Mohamed Mehdi Doura, Lebanon, TN (US); Jianmin Yin, Milwaukee, WI (US)

(73) Assignee: A. O. SMITH CORPORATION, Milwaukee, WI (US)

(21) Appl. No.: 18/827,439

(22) Filed: Sep. 6, 2024

Related U.S. Patent Documents

Reissue of:
(64) Patent No.: 11,761,677
Issued: Sep. 19, 2023
Appl. No.: 17/782,046
PCT Filed: Dec. 3, 2020
PCT No.: PCT/US2020/063116
§ 371 (c)(1),
(2) Date: Jun. 2, 2022
PCT Pub. No.: WO2021/113516
PCT Pub. Date: Jun. 10, 2021

U.S. Applications:
(60) Provisional application No. 62/943,490, filed on Dec. 4, 2019.

(51) Int. Cl.
*F24H 1/16* (2022.01)
*F24H 9/00* (2022.01)
(Continued)

(52) U.S. Cl.
CPC ..... *F24H 1/16* (2013.01); *F24H 9/0026* (2013.01); *F24H 9/2035* (2013.01);
(Continued)

(58) Field of Classification Search
CPC . F24H 1/16; F24H 8/00; F24H 9/2035; F24H 9/0026; F24H 1/125; F24H 1/43;
(Continued)

(56) References Cited

U.S. PATENT DOCUMENTS 4,502,626 A * 3/1985 Gerstmann ..... F24D 12/02 122/33
4,782,815 A 11/1988 Friedman et al.
(Continued)

FOREIGN PATENT DOCUMENTS

CA 2938331 A1 2/2011
CA 2852103 A1 4/2013
(Continued)

OTHER PUBLICATIONS

Hansa Heiztechnik. Pega—high-quality and first-class Wall-mounted gas condensing boiler brochure, Oct. 2017, (4 pages).
(Continued)

*Primary Examiner* — William C Doerrler
(74) *Attorney, Agent, or Firm* — Michael Best & Friedrich LLP

(57) ABSTRACT

A water heater includes an inner water tube coil and an outer water tube coil separated by a drum baffle. The inner and outer coils extend above a top edge of the drum baffle by at least a full turn of each coil. A flue gas bypass path is defined between a top edge of the drum baffle and a top insulation layer above the inner and outer coils. Flue gases flow radially though the inner coil, up along the drum baffle, through the flue gas bypass path, and downwardly over the outer coil to heat water flowing through the inner and outer coils. The water flows into the outer coil at the bottom of the coil, winds upwardly through the outer coil in countercurrent flow with respect to the flue gases, then down through the inner coil.

30 Claims, 6 Drawing Sheets

(51) Int. Cl.

| | |
|---|---|
| ***F24H 9/20*** | (2022.01) |
| ***F24H 15/174*** | (2022.01) |
| ***F24H 15/219*** | (2022.01) |
| ***F24H 15/238*** | (2022.01) |
| ***F24H 15/31*** | (2022.01) |
| ***F24H 15/335*** | (2022.01) |
| ***F24H 15/36*** | (2022.01) |
| ***F24H 15/45*** | (2022.01) |

(52) U.S. Cl.
CPC ..... *F24H 15/174* (2022.01); *F24H 15/219* (2022.01); *F24H 15/238* (2022.01); *F24H 15/31* (2022.01); *F24H 15/335* (2022.01); *F24H 15/36* (2022.01); *F24H 15/45* (2022.01)

(58) Field of Classification Search
CPC ..... F24H 15/31; F24H 15/174; F24H 15/36; F24H 15/45; F24H 15/335; F24H 15/238; F24H 15/219; F25D 19/0092; F24D 2200/046; F24D 2200/043; Y02B 30/00
See application file for complete search history.

(56) References Cited

U.S. PATENT DOCUMENTS

| | | | | |
|---|---|---|---|---|
| RE34,747 | E * | 10/1994 | Petty | C09K 5/047 62/476 |
| 5,687,678 | A | 11/1997 | Suchomel et al. | |
| 5,845,704 | A | 12/1998 | Lavelle et al. | |
| 8,042,608 | B2 | 10/2011 | Baker | |
| 9,470,433 | B2 * | 10/2016 | Cui | F24H 8/00 |
| 11,041,659 | B2 * | 6/2021 | De Nardis | F24H 8/006 |
| 2008/0149317 | A1 | 6/2008 | Baker | |
| 2010/0198417 | A1 | 8/2010 | Deivasigamani et al. | |
| 2011/0042470 | A1 | 2/2011 | Deivasigamani et al. | |
| 2012/0073519 | A1 | 3/2012 | Deivasigamani et al. | |
| 2014/0229022 | A1 | 8/2014 | Deivasigamani et al. | |
| 2015/0084749 | A1 | 3/2015 | Deivasigamani et al. | |
| 2015/0096505 | A1 | 4/2015 | Deivasigamani et al. | |
| 2015/0204541 | A1 | 7/2015 | Deivasigamani et al. | |
| 2015/0204550 | A1 | 7/2015 | Deivasigamani et al. | |
| 2015/0322672 | A1 | 11/2015 | Deivasigamani et al. | |
| 2015/0349972 | A1 | 12/2015 | Deivasigamani et al. | |
| 2015/0354831 | A1 | 12/2015 | Deivasigamani et al. | |
| 2016/0054020 | A1 | 2/2016 | Deivasigamani et al. | |
| 2016/0169071 | A1 | 6/2016 | Deivasigamani et al. | |
| 2016/0169539 | A1 | 6/2016 | Deivasigamani et al. | |
| 2016/0178219 | A1 | 6/2016 | Deivasigamani et al. | |
| 2016/0231006 | A1 | 8/2016 | Deivasigamani et al. | |
| 2016/0320075 | A1 | 11/2016 | Deivasigamani et al. | |
| 2016/0341445 | A1 | 11/2016 | Deivasigamani et al. | |
| 2016/0356492 | A1 | 12/2016 | Deivasigamani et al. | |
| 2017/0050201 | A1 | 2/2017 | Deivasigamani et al. | |

FOREIGN PATENT DOCUMENTS

| | | | | |
|---|---|---|---|---|
| CA | 2958321 | A1 | 2/2016 | |
| CN | 206617920 | U | 11/2017 | |
| CN | 109812977 | A | 5/2019 | |
| DE | 1907987 | A1 | 9/1970 | |
| DE | 202021101388 | U1 * | 5/2021 | F24H 1/43 |
| EP | 3719412 | A1 * | 10/2020 | |
| WO | WO-8402387 | A1 * | 6/1984 | F24D 11/002 |
| WO | WO-9623167 | A1 * | 8/1996 | F24H 1/43 |
| WO | WO-2006105605 | A1 * | 10/2006 | F28D 15/00 |
| WO | 2016193097 | A1 | 12/2016 | |

OTHER PUBLICATIONS

International Search Report and Written Opinion for Application No. PCT/US2020/063116 dated Feb. 24, 2021 (11 pages).
International Preliminary Report on Patentability for Application No. PCT/US2020/063116 dated May 17, 2022 (5 pages).

* cited by examiner

WATER HEATER HAVING HIGHLY EFFICIENT AND COMPACT HEAT EXCHANGER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

This application claims priority to U.S. Provisional Patent Application No. 62/943,490 filed on Dec. 4, 2019, the entire contents of which are incorporated herein by reference.

BACKGROUND

The present invention relates to a coil configuration for a water heater.

Coil finned type heat exchangers of the type used in gas instantaneous water heaters have shown a longer life span, in comparison to other types of heat exchangers, in applications where the water is of inferior quality. Several configurations of coil finned type heat exchangers have traditionally been used in such applications, each having advantages and disadvantages. Coil finned heat exchangers having a single coil typically have a high thermal efficiency, but they are typically large in size, making it difficult to package them into a gas instantaneous water heater. In contrast, coil finned heat exchangers with a two-layer coil layout are much more compact than in a one-layer coil heat exchanger. However, in a two-layer coil, flue gas flows radially through the inner and outer coils. As a result, the flue gas is not in countercurrent heat transfer relationship with the water, resulting in lower thermal efficiency.

Thus there is a need for a coil finned heat exchanger design that balances the competing advantages of the aforementioned two types of heat exchangers in terms of size and efficiency.

SUMMARY

In one embodiment, a heat exchanger includes an inner coil having a plurality of helically wound inner coil turns and an outer coil having a plurality of helically wound outer coil turns. The outer coil is positioned circumferentially around the inner coil relative to a central axis of the inner coil. An insulation layer is positioned over a last one of the inner coil turns and a last one of the of outer coil turns. A radial-flow baffle overlays spaces between adjacent turns of the plurality of inner coil turns.

The heat exchanger further includes a drum baffle having a wall positioned between the inner coil and the outer coil. The drum baffle extends in a first direction parallel to the central axis from a first one of the inner coil turns and a first one of the outer coil turns toward the insulation layer. The drum baffle terminates at an edge that is spaced below at least a portion of the last one of the inner coil turns.

A flue gas bypass path is defined between the edge of the drum baffle and the insulation layer. The flue gas bypass path has a width that is at least equal to a helical pitch of the inner coil. A slotted baffle is positioned between adjacent turns of the plurality of outer coil turns. The flue gases are configured to flow radially outward over the inner coil, in the first direction along the drum baffle wall, through the flue gas bypass path, and then in a second direction opposite the first direction over the outer coil to heat water flowing through the inner coil and the outer coil.

In another embodiment, a heat exchanger includes an inner coil having a plurality of helically wound inner coil turns and an outer coil having a plurality of helically wound outer coil turns. The outer coil is positioned circumferentially around the inner coil relative to a central axis of the inner coil. An end member is positioned over a last one of inner coil turns and a last one of the outer coil turns. A first baffle overlays spaces between adjacent turns of the plurality of inner coil turns.

The heat exchanger further includes a second baffle having a wall positioned between the inner coil and the outer coil. The second baffle extends in a first direction parallel to the central axis from a first one of the inner coil turns and a first one of the outer coil turns toward the end member. The second baffle terminates at an edge that is spaced below at least a portion of the last one of the inner coil turns.

A flue gas bypass path is defined between the edge of the second baffle and the end member. The flue gas bypass path has a width that is at least equal to a helical pitch of the inner coil. The flue gases are configured to flow radially outward over the inner coil, in the first direction along the second baffle wall, through the flue gas bypass path, and then in a second direction opposite the first direction over the outer coil to heat water flowing through the inner coil and the outer coil.

In yet another embodiment, a method of heating water using a heat exchanger includes providing an inner coil having a plurality of helically wound inner coil turns and an outer coil having a plurality of helically wound outer coil turns. The outer coil is positioned circumferentially around the inner coil relative to a central axis of the inner coil. The method further includes providing an insulation layer positioned over a last one of the inner coil turns and a last one of the outer coil turns, and a drum baffle positioned between the inner coil and the outer coil.

The method further includes conducting the water first through the outer coil and subsequently through the inner coil, generating flue gases with a burner, and flowing the flue gases radially outward over the inner coil to heat the water flowing through the inner coil. The method further includes flowing the flue gases in a first direction parallel to the central axis along a wall of the drum baffle toward the insulation layer, directing the flue gases through a flue gas bypass path arranged between the insulation layer and a terminal edge of the drum baffle, and flowing the flue gases in a second direction opposite the first direction over the outer coil to heat the water flowing through the outer coil.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
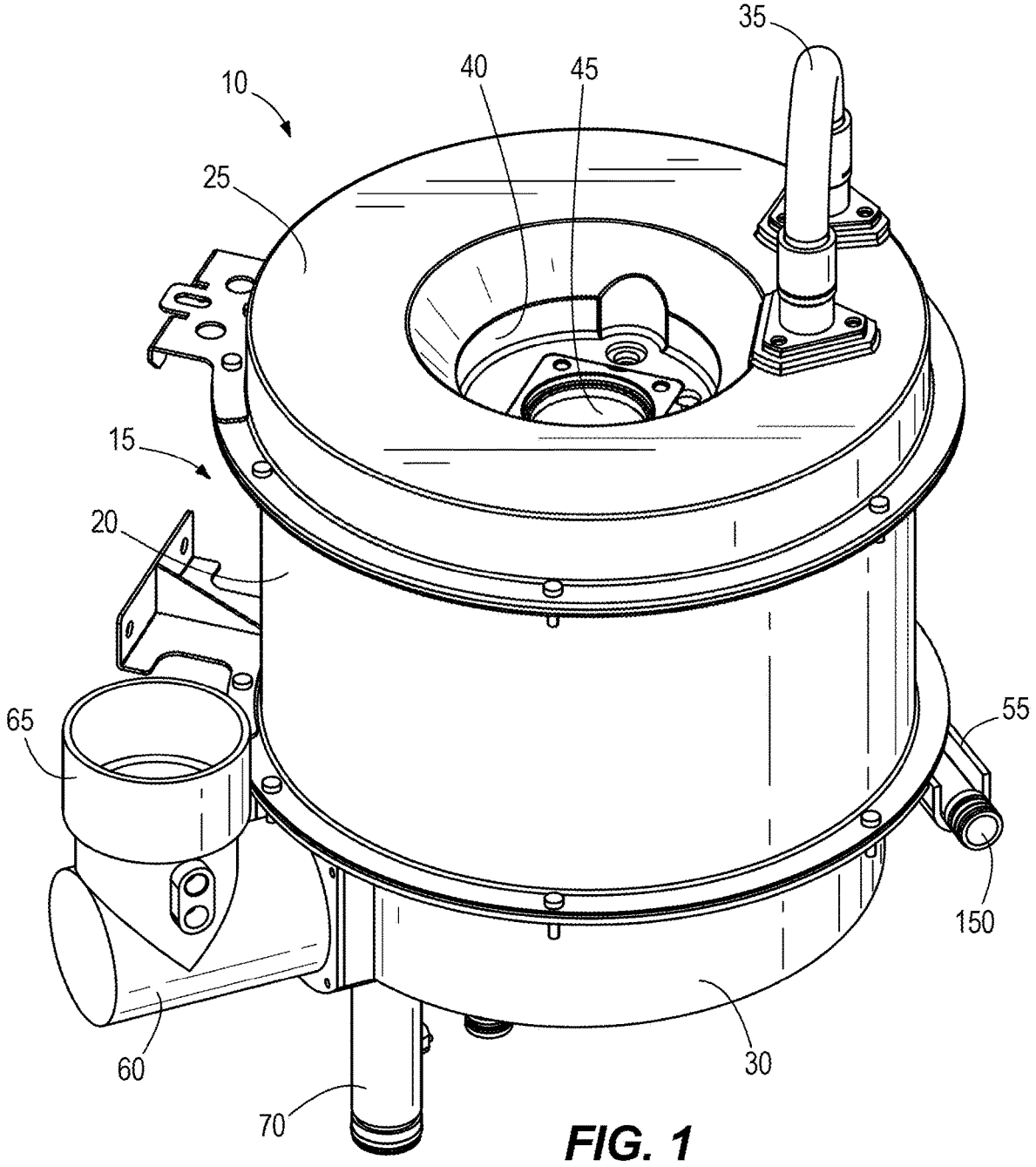
FIG. 1 is a perspective view of a water heater constructed according to an embodiment of the present invention.
Figure 2:
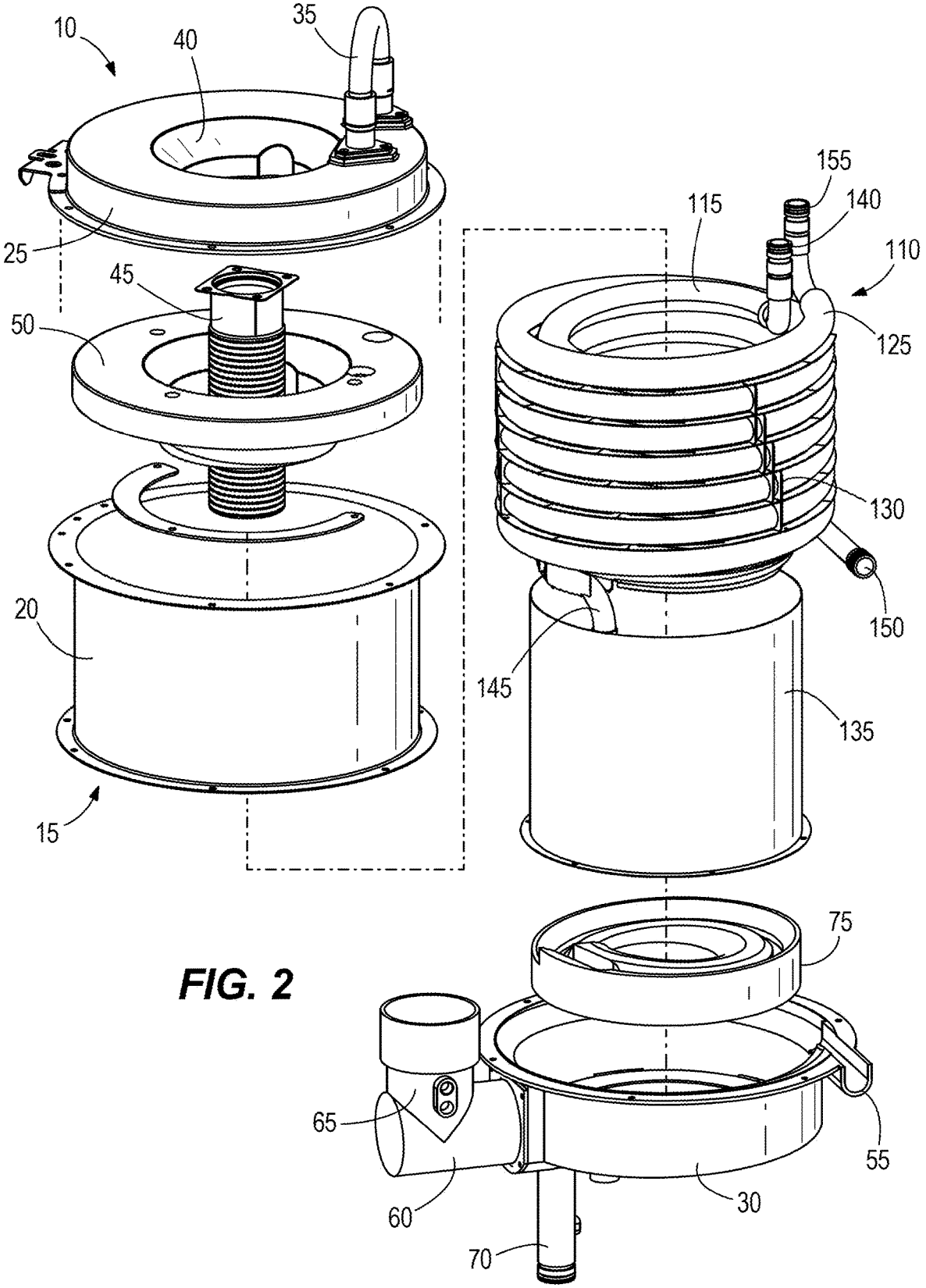
FIG. 2 is an exploded view of the water heater of FIG. 1.

FIGS. 1 and 2 illustrate a water heater 10 embodying the present invention. The water heater 10 includes a housing 15 having a middle portion or jacket 20, a top portion 25 and a bottom portion 30. The middle portion 20 surrounds a heat exchanger 110 which will be discussed in more detail below. The top portion 25 is mounted to a top end of the middle portion 20 and includes a transfer conduit 35 and a combustion intake aperture 40. A burner 45 is positioned in the combustion intake aperture 40 and descends from the top portion 25 into the center of the heat exchanger 110. A top insulation layer 50 is arranged between the top portion 25 and the top of the heat exchanger 110. The bottom portion 30 is mounted to a bottom end of the middle portion 20. The bottom portion 30 includes a cold water inlet support 55, an exhaust assembly 60 (including an exhaust elbow 65), and a condensate drain 70. A bottom insulation layer 75 is arranged between the bottom of the heat exchanger 110 and the bottom portion 30.

Figure 3:
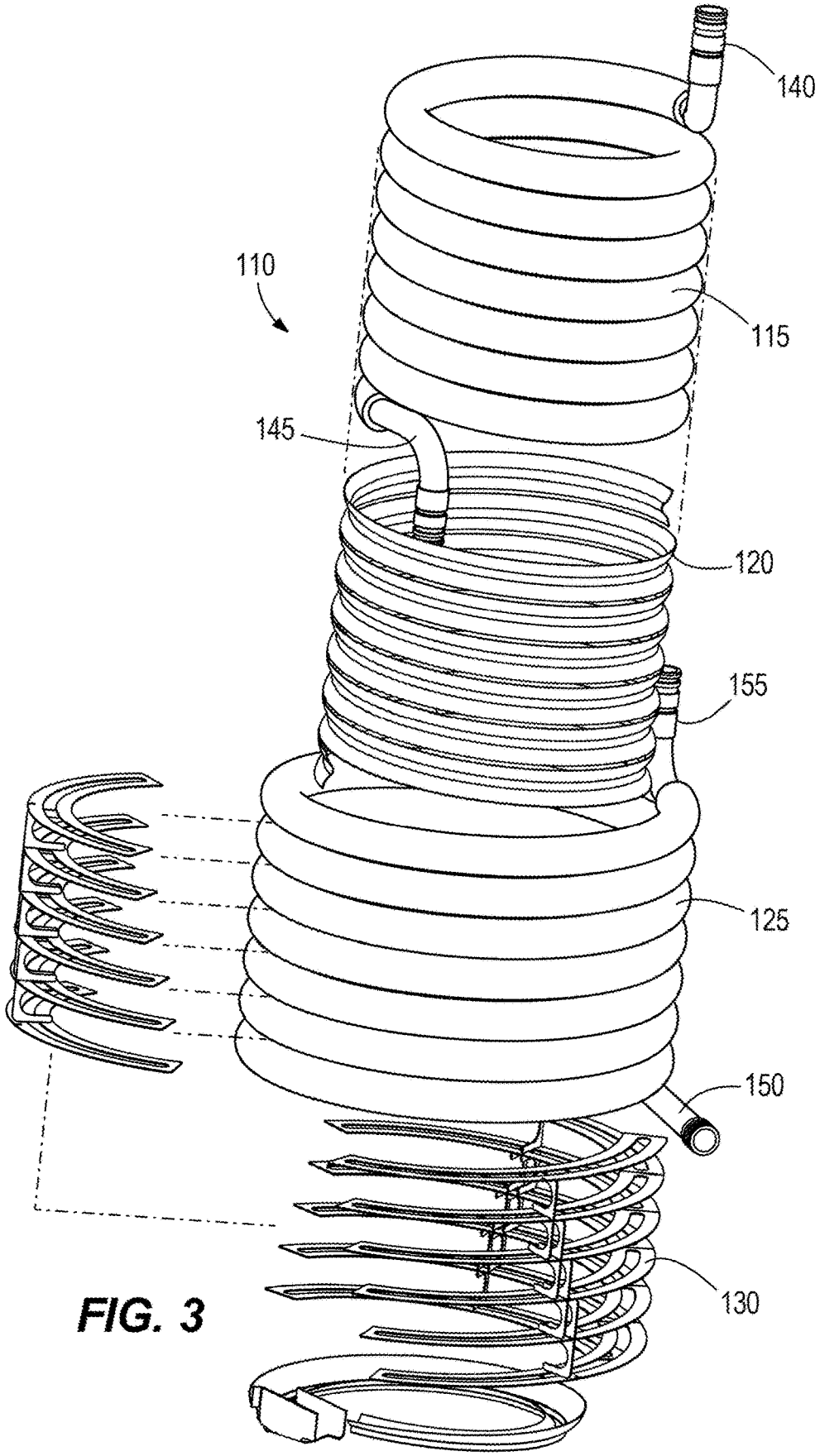
FIG. 3 is an exploded view of a heat exchanger assembly used in the water heater of FIG. 1.

Turning now to FIG. 3, the heat exchanger 110 includes an inner coil 115, a strip baffle 120, an outer coil 125, a slotted baffle 130, and a drum baffle 135 (FIG. 2). The inner coil 115 includes an inner coil inlet 140 at the top of the inner coil 115 (e.g., connected to a last one of the coil turns of the inner coil 115) and a hot water outlet 145 at the bottom of the inner coil 115 (e.g., connected to a first one of the coil turns of the inner coil 115). The inner coil 115 is constructed of a finned tube that is wound in helical fashion to form the inner coil 115. For purposes of illustration, the annularly shaped fins joined to the outer wall surfaces are depicted without showing the individual gaps between the fins, but one of skill in the art would understand that the individual fins are spaced apart to allow for the passage of gas between the fins and over the outer surfaces of the tube wall. In order to maximize the transfer of heat, the inner coil is wound to have a helical pitch that is approximately equal to the outer diameter of the fins.

Figure 4:
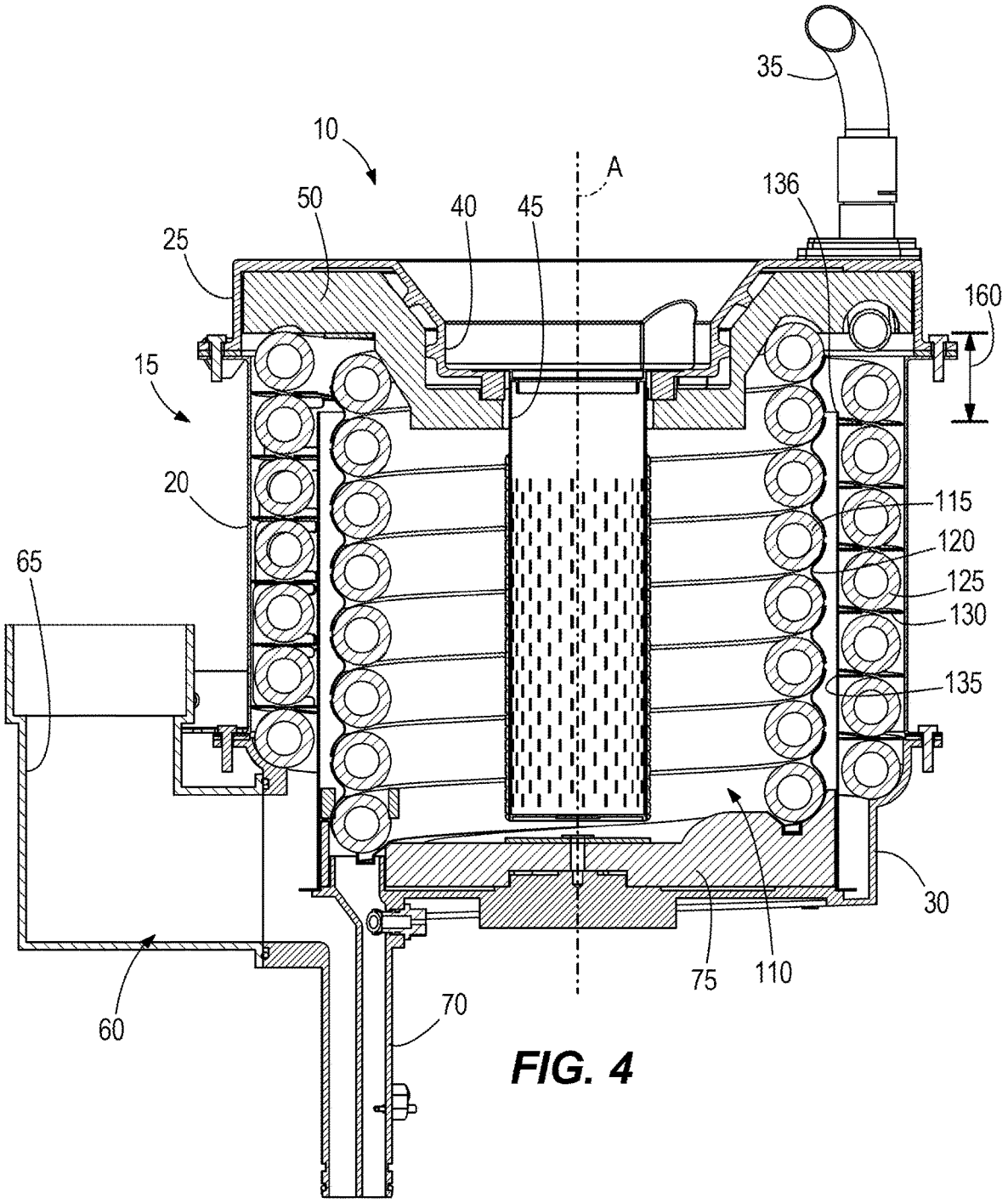
FIG. 4 is a cross-section view of the water heater of FIG. 1.

As shown in FIG. 4, the inner coil 115 winds about a central axis A such that the central axis A extends therethrough. The burner 45 is positioned radially inward of the inner coil 115 and extends along the central axis A. In addition, the outer coil 125 is positioned circumferentially around the inner coil 115 relative to the central axis A. The inner coil 115 and the outer coil 125 are of a similar height, and are arranged such that the bottom end of the inner coil 115 is arranged in proximity to the bottom end of the outer coil 125, and the top end of the inner coil 115 is arranged in proximity to the top end of the outer coil 125. The drum baffle 135 provides a cylindrical wall between the inner coil 115 and the outer coil 125. The drum baffle 135 extends upwardly from the bottom (e.g., the first one of the coil turns) of the inner and outer coils 115, 125 and terminates at a top edge 136.

The strip baffle 120 winds around the outside of the inner coil 115, overlaying the spaces between adjacent turns of the inner coil 115. Each turn of the strip baffle 120 is spaced from the previous turn so that a flue gas flow path is provided about mid-height on each turn of the inner coil 115 for flue gases to flow radially outward away from the inner coil 115. The strip baffle 120 ensures that products of combustion flow through the fins of the inner coil 115 and over substantially the entire outer tube wall surface of the inner coil 115 before passing through the gaps between adjacent turns of the strip baffle 120 into a space bounded by the strip baffle 120 and the drum baffle 135.

Figure 5:
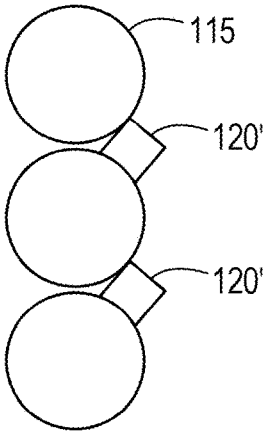
FIG. 5 is a schematic representation of an inner coil of the heat exchanger of FIG. 3 according to some embodiments.

With reference to FIG. 5, in other constructions, the strip baffle 120 can be replaced with a packing seal 120' in the gap between the turns of the inner coil 115, winding around the outside of the inner coil 115. Such packing seal 120' would perform essentially the same function as the strip baffle 120 by preventing products of combustion from flowing directly radially out between the turns of the inner coil 115. Such packing seal 120' can be made, for example, of PFTE-impregnated synthetic fiber, synthetic yarn, or rope. Such packing seal 120' can be of substantially any cross-sectional shape, including round and non-round cross sections. References to cross-sectional shape are made with respect to the cross-sectional shape when the packing seal 120' is not compressed or stressed. Examples, without limitation, of non-round cross sections include square cross-section, rectangular cross-section, and triangular cross-section. The strip baffle 120 and alternative packing seals 120' described above are collectively referred to as radial-flow baffles because they prevent the purely radial free flow of products of combustion out of the inner coil 115 through the gap between the turns of the inner coil 115, thereby improving the transfer of heat from the flue gases to the inner coil 115.

The outer coil 125 surrounds the inner coil 115 and includes a cold water inlet 150 and an outer coil outlet 155. The cold water inlet 150 is supported by the water inlet support 55 (FIG. 1). The cold water inlet 150 is positioned at the bottom of the outer coil 125 (e.g., connected to a first one of the coil turns of the outer coil 125) and the outer coil outlet 155 is positioned at the top of the outer coil 125 (e.g., connected to a last one of the coil turns of the outer coil 125). The outer coil 125 is constructed of a finned tube that is wound in helical fashion to form the outer coil 125, in similar fashion to the previously described inner coil 115. The slotted baffle 130 provides a slot (defining a flue gas flow path) at the bottom of each turn of the outer coil 125 so that flue gases must flow around substantially the entire tube wall surface area of each turn before dropping down to the next turn. The slotted baffle 130 maximizes the surface area contact of products of combustion over the surfaces of the outer coil 125.

During assembly, the water circuit of the water heater 10 is established by connecting the cold water inlet 150 to a supply of cold water, connecting the outer coil outlet 155 to the transfer conduit 35, connecting the inner coil inlet 140 to the transfer conduit 35, and connecting the hot water outlet 145 to a hot water supply conduit of the building in which the water heater 10 is plumbed. Water thus flows in through the cold water inlet 150, winds upwardly through the outer coil 125, flows out of the outer coil 125 and into the inner coil 115 through the outer coil outlet 155, transfer conduit 35, and inner coil inlet 140, and then winds downwardly through the inner coil 115 to the hot water outlet 145.

A supply of air and combustible gas is delivered to the burner 45 through the combustion intake aperture 40. Products of combustion or flue gases generated by the burner 45 flow radially outwardly through the inner coil 115, over the fins and tube of the inner coil 115 and between the turns of the strip baffle 120. The flue gases then flow upward between an inward face of the drum baffle 135 wall and the strip baffle 120. At the top of the drum baffle 135, the flue gases make a 180° turn through a flue gas bypass path 160 created by a gap between the top edge 136 of the drum baffle 135 and the bottom of the top insulation layer 50, and then flow downward over the turns of the outer coil 125. The slotted baffle 130 ensures that the flue gases flow over substantially the entire surface area of each turn of the outer coil 125 before advancing down to the next turn.

The drum baffle 135, strip baffle 120 and slotted baffle 130 enhance heat transfer to water in the inner coil 115 and outer coil 125 by maximizing surface area contact and time of contact, which improves the performance of the heat exchanger. When the flue gases reach the bottom of the outer coil 125, they are collected in the exhaust assembly 60 and delivered through the elbow 65 to an appropriate exhaust conduit. Condensate forming on the outer coil 125 or in the exhaust assembly 60 drips down and out of the water heater 10 through the condensate drain 70.

The configuration of the present heat exchanger 110 results in countercurrent flow between the water and flue gas at outer coil 125. Countercurrent flow results in high thermal efficiency, maximizing the transfer of heat from the flue gas into the water in the outer coil 125. Thermal efficiency (also referred to as heat exchanger effectiveness) can be expressed as a percentage, calculated by dividing the actual rate of heat transfer in the heat exchanger by the maximum possible sensible heat transfer rate (i.e. the rate of heat transfer that would result if the flue gas was cooled down to the water inlet temperature). As the heat transfer rate approaches 100%, the temperature differential between the flue gas near its exit and the water temperature necessarily becomes increasingly small. Thus, the additional heat exchange surface area required to drive higher heat exchanger efficiencies increases dramatically, leading to the need for a much less compact heat exchanger. Using the exemplary embodiment, however, the inventors found that the heat exchanger thermal efficiency was improved to 95.4%, in comparison to 94.2% efficiency using a double-coil radial flow heat exchanger of the same size that did not include baffling on and between the coils.

As can be seen in FIG. 4, the drum baffle 135 does not extend to the top of the inner coil 115 or outer coil 125. Instead, at least a portion of one turn of the inner coil 115 and at least a portion of one turn of the outer coil 125 extend above the top edge 136 of the drum baffle 135. This configuration gives rise to a flue gas bypass path 160 between the bottom of the top insulation layer 50 and the top of the drum baffle 135.

As flue gas passes radially from an interior of the drum baffle 135 to an exterior of the drum baffle 135 through the bypass path 160, the full flow of flue gas can impinge on the upper turn portions of the coils 115, 125. The width (measured vertically in FIG. 4) of the flue gas bypass path 160 directly affects the tube wall temperatures of the top turn (i.e., the last turn) of particularly the inner coil 115. The smaller the flue gas bypass path 160, the greater the rate of heat transfer to the top turn of the inner coil 115 will be, resulting in increased tube wall temperatures of that turn. Tube wall temperature is a key prediction factor for an undesirable buildup of minerals, or scaling, in the tube. As the width of the flue gas bypass path 160 increases, the tube wall temperature on that upper turn will decrease, thereby lowering the likelihood of scaling in the top turn of the inner coil 115. If the flue gas bypass path 160 is too wide, however, thermal efficiency can be compromised.

Testing by the inventors has demonstrated that the width of the flue gas bypass path 160 can be optimized in order to achieve a desirable tradeoff between scaling propensity and thermal efficiency. For instance, the inventors found that a thermal efficiency of 95.6% can be achieved with a width of the flue gas bypass path 160 set at 20 mm. However, the resulting maximum tube wall temperature in that design reached 306° F. at the top (i.e., the last one of the coil turns) of the inner coil 115, a temperature at which the heat exchanger may be prone to scaling. The inventors found that when the width of the flue gas bypass path 160 was increased to 40 mm, the maximum temperature was reduced to about 245° F., a temperature at which the risk of scaling is substantially reduced, with only a slight decrease in thermal efficiency to 95.4%. In at least some preferable embodiments, the width of the flue gas bypass path is at least equal to the helical pitch of the inner coil.

Figure 6:
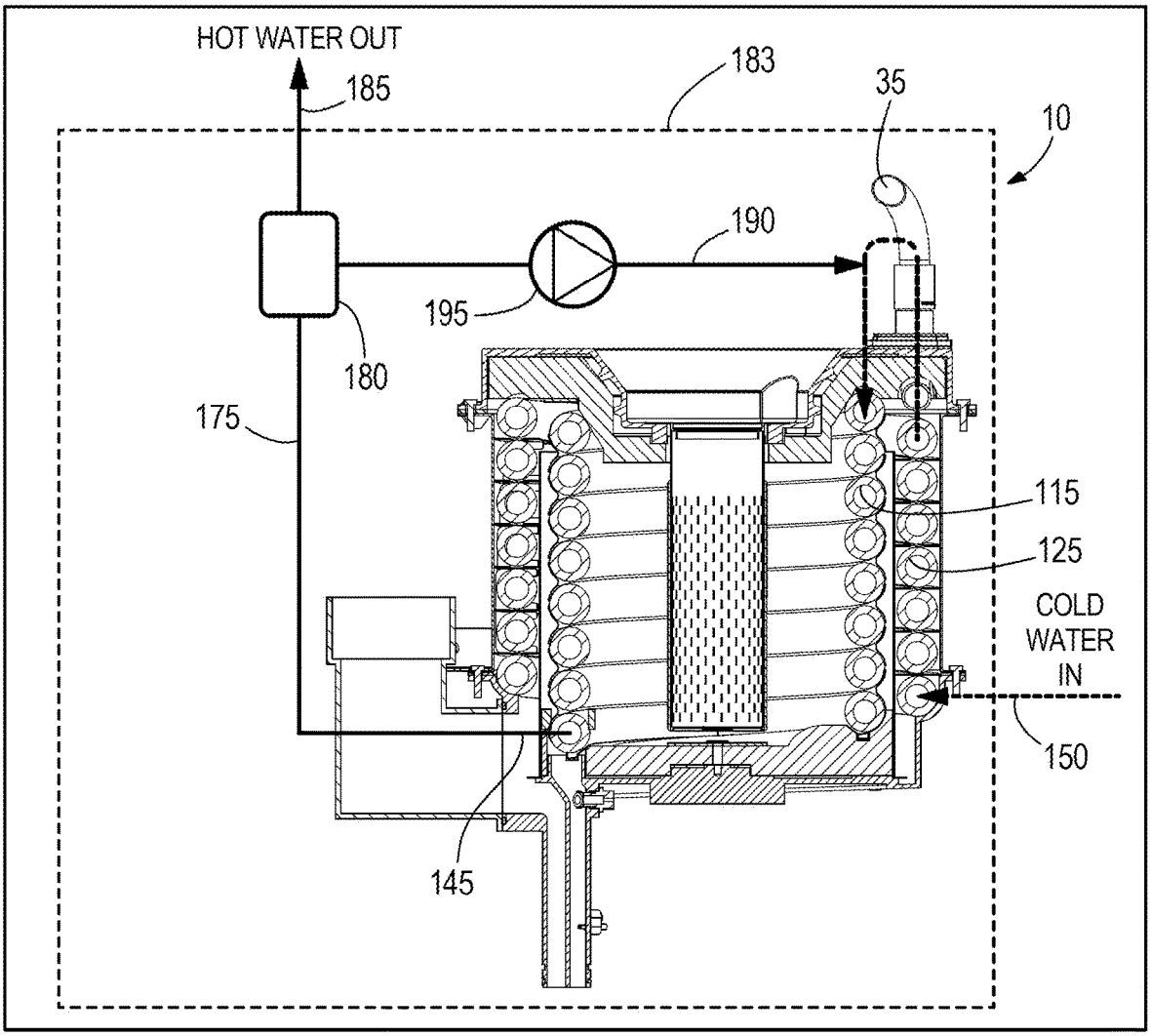
FIG. 6 is a schematic representation of a water heater configuration according to some embodiments.

The undesirable formation of scale in the heat exchanger can also be achieved by increasing the flow rate of water through the inner coil 115. FIG. 6 illustrates a first configuration of water flow in the water heater 10 according to one embodiment of the invention. In this configuration, cold water flows into the bottom of the outer coil 125 through the cold water inlet 150 and winds its way up to the top of the outer coil 125. The water is transferred from the top of the outer coil 125 to the top of the inner coil 115 through the transfer conduit 35. The water then flows down through the inner coil 115 to the hot water outlet 145. Hot water flows from the hot water outlet 145 through an initial hot water pipe 175 to an internal buffer tank 180 housed within the water heater cabinet 183. A hot water delivery pipe 185 communicates between the internal buffer tank 180 and the hot water point of use (e.g., a faucet or appliance) where the hot water is consumed. The buffer tank 180 can be eliminated in some alternative embodiments and can be replaced with, for example, a T-connection. Thus, the buffer tank 180 is optional.

The configuration of FIG. 6 further includes a recirculation system with a recirculation pipe 190 communicating between the buffer tank 180 and the transfer conduit 35, and a recirculation pump 195 along the recirculation pipe 190. This configuration recirculates a portion of the water from the hot water supply system (i.e. the hot water outlet 145, initial hot water pipe 175, buffer tank 180, and hot water delivery pipe 185) to the inner coil 115. By introducing the recirculated heated water downstream of the outer coil 125, the temperature of the water in that outer coil 125 is maintained at a low temperature so that the thermal efficiency of the water heater is not compromised. The heated water from the recirculation pipe 190 is added to the partially heated water from the outer coil 125, and the combined flow of water passes through the inner coil 115. The water velocity in the inner coil 115 is thus increased, which decreases the risk of scale formation at the top of the inner coil 115.

The inventors have found that the flow velocity can be increased to reduce the risk of scale formation with very little decrease in thermal efficiency using the recirculation system shown in FIG. 6. In comparison, when the recirculated water is introduced before the water inlet 150 so that it also flows through the outer coil 125, the thermal efficiency is substantially reduced. As the wall temperatures in the colder outer coil 125 are already low enough to avoid scale formation, no added benefit is provided by increasing the water velocity in that coil.

The advantages of the configuration of FIG. 6 are especially significant when the water heater 10 is operated at a reduced operating level, i.e. reduced flow rates of water, combustion air, and combustion gas. Without any recirculation, high thermal efficiency is readily achieved at low flow rates because the heat exchanger is effectively oversized for the reduced flow rates of water and flue gas. However, the reduced flow rate of water also results in a reduced water velocity in those regions that are exposed to high wall temperatures, which increases the risk of scale formation. The inventors have found that in operating the water heater at a highly reduced operating level (e.g. at approximately 15% of maximum heat input), when water is recirculated to the water inlet 150 at a rate sufficient to maintain the velocity necessary to prevent scale formation, the thermal efficiency is reduced by as much as 7%. However, when the water is instead recirculated to the inner coil 115 only, as depicted in FIG. 6, a thermal efficiency reduction of only 1% was observed.

Figure 7:
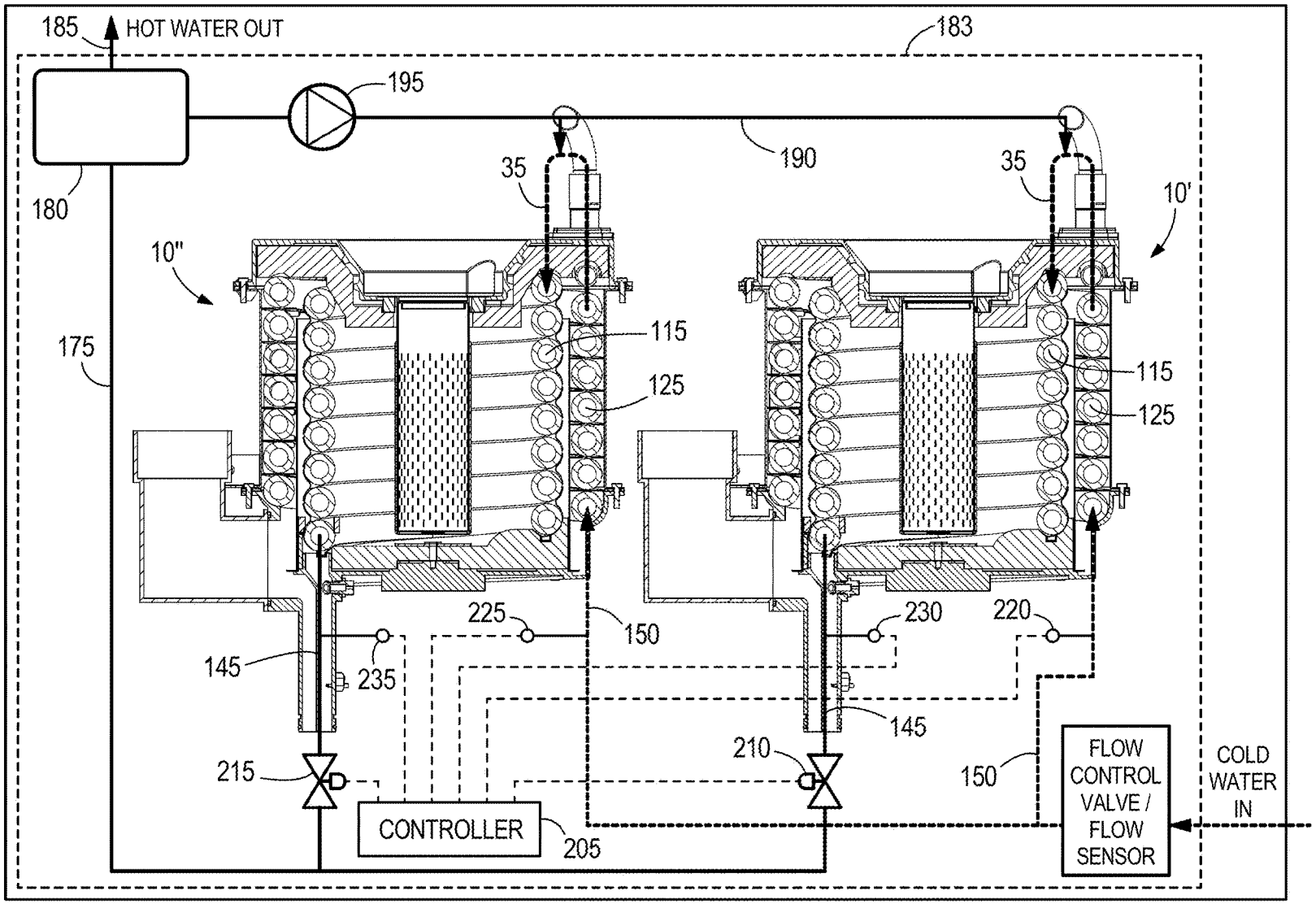
FIG. 7 is a schematic representation of a water heater configuration according to other embodiments.

FIG. 7 illustrates another configuration, with multiple water heaters 10 arranged in a single cabinet 183 and configured to increase the hot water output of the system. In this embodiment, the two water heaters 10 act together as a single water heater. The water heater 10' on the right in FIG. 7 can be referred to as HEX-1 and the water heater 10" on the left can be referred to as HEX-2 and the water heaters 10', 10" can be referred to collectively or generically individually as water heaters 10. Cold water is supplied in parallel to the cold water inlets 150 of the respective water heaters 10 and hot water flows out of the respective hot water outlets 145. The hot water flows from the hot water outlets 145 in parallel to the optional buffer tank 180 through the initial hot water pipe 175. Hot water flows from the buffer tank 180 to a point of use through the hot water delivery pipe 185 for consumption or through a recirculation pipe 190 under the influence of the recirculation pump 195 for parallel delivery to the respective transfer conduits 35.

The system of FIG. 7 includes a controller 205, valves 210, 215 on the hot water outlets of the respective HEX-1 10' and HEX-2 10", flow sensors 220, 225 on the cold water inlets of the respective HEX-1 10' and HEX-2 10", and outlet temperature sensors 230, 235 on the hot water outlets of the respective HEX-1 10' and HEX-2 10". Wired or wireless connection is illustrated schematically between the controller 205 and each of the valves 210, 215, flow sensors 220, 225, and temperature sensors 230, 235. Although not shown, the controller 205 can additionally communicate by wired or wireless connection to other components of the system, including but not limited to gas supply valves, ignition sources, blowers, recirculation pump, etc.

When the unit is in standby mode, one of the hot water outlet valves (e.g. valve 210) is open and the other hot water outlet valve (e.g. valve 215) is closed. When there is a draw of hot water from the hot water delivery pipe 185, water will flow past the cold water inlet flow sensor that corresponds to the open hot water valve (e.g. flow sensor 220). The controller 205 will make one of three determinations based on the amount measured at flow sensor 220: (i) energize the recirculation pump 195, and ignite the burner in the HEX-1 10'; (ii) ignite the burner of just HEX-1 10' without energizing the recirculation pump 195; or (iii) open valve 215 and ignite the burner of both HEX-1 10' and HEX-2 10". While in operation, each of HEX-1 10' and HEX-2 10" are modulated by the controller 205 based on the outlet temperature measured at temperature sensors 230, 235 relative to the hot water set point. As demand falls and there is heat generated in excess of what is needed based on the outlet temperature sensors 230, 235, the controller 205 turns off HEX-2 10" and closes valve 215. HEX-1 10' would then be modulated alone by controller 205 based on the outlet temperature at sensor 230 compared to a setpoint. The controller 205 can turn the recirculation pump 195 back on while HEX-1 10' is running alone based either on the outlet temperature comparison to the setpoint or the flow sensor 220. This control logic could be repeated with additional water heaters 10 (HEX's).

By operating only a subset of the multiple water heaters at reduced demand, the water velocity in the inner coil of the operational heat exchanger can be maintained sufficiently high to reduce the risk of scaling with little or no recirculation at certain demand levels. Scale formation can thereby be prevented without the decrease in thermal efficiency that would result from the recirculation.

What is claimed is:

1. A heat exchanger comprising:

an inner coil having a plurality of helically wound inner coil turns, the inner coil defining a central axis extending therethrough;

an outer coil having a plurality of helically wound outer coil turns, the outer coil positioned circumferentially around the inner coil relative to the central axis;

an insulation layer positioned over a last one of the plurality of inner coil turns of the inner coil and a last one of the plurality of outer coil turns of the outer coil;

a radial-flow baffle overlaying spaces between adjacent turns of the plurality of inner coil turns;

a drum baffle including a wall positioned between the inner coil and the outer coil, the drum baffle extending in a first direction parallel to the central axis from a first one of the plurality of inner coil turns and a first one of the plurality of outer coil turns toward the insulation layer to an edge that is spaced below at least a portion of the last one of the plurality of inner coil turns;

a flue gas bypass path defined between the edge of the drum baffle and the insulation layer, the flue gas bypass path having a width at least equal to a helical pitch of the inner coil; and a slotted baffle positioned between adjacent turns of the plurality of outer coil turns;

wherein flue gases are configured to flow radially outward over the inner coil, in the first direction along the drum baffle wall, through the flue gas bypass path, and then in a second direction opposite the first direction over the outer coil to heat water flowing through the inner coil and the outer coil.

2. The heat exchanger of claim 1, wherein the outer coil includes a water inlet at an end of the first one of the plurality of outer coil turns such that water flowing through the outer coil winds in the first direction in countercurrent flow with respect to the flow of flue gases in the second direction over the outer coil.

3. The heat exchanger of claim 1, further comprising a transfer conduit connected between an end of the last one of the plurality of outer coil turns and an end of the last one of the plurality of inner coil turns.

4. The heat exchanger of claim 1, wherein the inner coil includes a water outlet at an end of the first one of the plurality of inner coil turns.

5. The heat exchanger of claim 1, wherein the radial-flow baffle is a strip baffle or a packing seal of non-circular cross-section.

6. The heat exchanger of claim 1, wherein the flue gas bypass path is configured to cause the flue gases to make a 180° turn.

7. The heat exchanger of claim 1, further comprising a burner positioned radially inward of the inner coil relative to the central axis, the burner extending along the central axis, and wherein the burner is configured to generate the flue gases.

8. A heat exchanger comprising:

an inner coil having a plurality of helically wound inner coil turns, the inner coil defining a central axis extending therethrough;

an outer coil having a plurality of helically wound outer coil turns, the outer coil positioned circumferentially around the inner coil relative to the central axis;

an end member positioned over a last one of the plurality of inner coil turns of the inner coil and a last one of the plurality of outer coil turns of the outer coil;

a first baffle overlaying spaces between adjacent turns of the plurality of inner coil turns;

a second baffle including a wall positioned between the inner coil and the outer coil, the second baffle extending in a first direction parallel to the central axis from a first one of the plurality of inner coil turns and a first one of the plurality of outer coil turns toward the end member to an edge that is spaced below at least a portion of the last one of the plurality of inner coil turns; and a flue gas bypass path defined between the edge of the second baffle and the end member, the flue gas bypass path having a width at least equal to a helical pitch of the inner coil;

wherein flue gases are configured to flow radially outward over the inner coil, in the first direction along the second baffle wall, through the flue gas bypass path, and then in a second direction opposite the first direction over the outer coil to heat water flowing through the inner coil and the outer coil, and wherein the heat exchanger further comprises a transfer conduit connected between an end of the last one of the plurality of outer coil turns and an end of the last one of the plurality of inner coil turns.

9. The heat exchanger of claim 8, wherein the outer coil includes a water inlet at an end of the first one of the plurality of outer coil turns such that water flowing through the outer coil winds in the first direction in countercurrent flow with respect to the flow of flue gases in the second direction over the outer coil.

10. The heat exchanger of claim 8, wherein the inner coil includes a water outlet at an end of the first one of the plurality of inner coil turns.

11. The heat exchanger of claim 8, wherein the first baffle is a strip baffle or a packing seal of non-circular cross-section.

12. The heat exchanger of claim 8, wherein the first baffle is configured to direct the flue gases circumferentially around a portion of an outer surface of each of the plurality of inner coil turns as the flue gases flow radially outward over the inner coil.

13. The heat exchanger of claim 8, further comprising a third baffle positioned between adjacent turns of the plurality of outer coil turns, the third baffle including a slot between each of the adjacent turns of the plurality of outer coil turns, and wherein the third baffle is configured to direct the flue gases around an entire surface area of each turn of the plurality of outer coil turns before flowing through the subsequent slot as the flue gases flow in the second direction over the outer coil.

14. The heat exchanger of claim 8, wherein the flue gas bypass path is configured to cause the flue gases to make a 180° turn.

15. The heat exchanger of claim 8, further comprising a burner positioned radially inward of the inner coil relative to the central axis, the burner extending along the central axis, and wherein the burner is configured to generate the flue gases.

16. The heat exchanger of claim 8, wherein the width of the flue gas bypass path is measured between the edge of the baffle and the end member relative to the central axis, and wherein the width is at least 40 mm.

17. A method of heating water using a heat exchanger, the method comprising:

providing an inner coil of an inner water tube having a plurality of helically wound inner coil turns, the inner coil defining a central axis extending therethrough, an outer coil of an outer water tube having a plurality of helically wound outer coil turns, the outer coil positioned circumferentially around the inner coil relative to the central axis, an insulation layer positioned over a last one of the plurality of inner coil turns of the inner coil and a last one of the plurality of outer coil turns of the outer coil, and a drum baffle positioned between the inner coil and the outer coil;

conducting the water first through the outer coil and subsequently through the inner coil;

generating flue gases with a burner;

flowing the flue gases radially outward over the inner coil to heat the water flowing through the inner coil;

flowing the flue gases in a first direction parallel to the central axis along a wall of the drum baffle toward the insulation layer;

directing the flue gases through a flue gas bypass path arranged between the insulation layer and a terminal edge of the drum baffle; and flowing the flue gases in a second direction opposite the first direction over the outer coil to heat the water flowing through the outer coil, wherein conducting the water first through the outer coil and subsequently through the inner coil comprises flowing the water through the outer coil at a first flow velocity and flowing the water through the inner coil at a second flow velocity greater than the first flow velocity.

18. The method of claim 17, wherein conducting the water through the outer coil further includes introducing the water at a water inlet positioned at an end of a first one of the plurality of outer coil turns, and flowing the water through the outer coil such that the water winds in the first direction in a countercurrent flow with respect to the flow of flue gases in the second direction over the outer coil.

19. The method of claim 17, further comprising directing the flues gases around an outer surface of each of the plurality of inner coils turns of the inner coil by a radial-flow baffle, and directing the flue gases around an entire surface area of each turn of the plurality of outer coil turns of the outer coil by a slotted baffle.

20. The method of claim 17, further comprising recirculating a portion of the water back to an inlet of the inner coil after having conducted the water through the inner coil.

*21. A method of heating water using a heat exchanger, the method comprising:*

*providing a water circuit extending between a cold water inlet and a hot water outlet, the water circuit having a first section extending from the cold water inlet and a second section extending to the hot water outlet;*

*conducting water first through the first section and subsequently through the second section;*

*generating flue gases with a burner;*

*transferring heat from the flue gases to the second section to heat water being conducted through the second section;*

*transferring heat from the flue gases to the first section to heat water being conducted through the first section; and*

*operating a recirculation pump in order to recirculate a recirculated portion of the water from the hot water outlet to flow through the second section but not through the first section,*

*wherein conducting the water first through the first section and subsequently through the second section comprises flowing the water through the first section at a first flow velocity and flowing the water combined with the recirculated portion of the water through the second section at a second flow velocity greater than the first flow velocity, and*

*wherein the recirculated portion of the water is combined with the water from the first section downstream of the recirculation pump.*

*22. The method of claim 21, wherein transferring heat from the flue gases to the first section comprises flowing the flue gases countercurrent to a flow direction of the water being conducted through the first section.*

*23. The method of claim 21, wherein the water circuit is one of a plurality of water circuits, further comprising:*

*delivering cold water in parallel to the cold water inlets of the plurality of water circuits;*

*receiving heated water in parallel from the hot water outlets of the plurality of water circuits; and*

*operating the recirculation pump to recirculate at least some of the recirculated portion of the water through each of the plurality of water circuits.*

*24. The method of claim 23, wherein the burner is one of plurality of burners, each of the plurality of burners corresponding to one of the plurality of water circuits, further comprising:*

*measuring a heated water temperature from each one of the plurality of water circuits; and*

*modulating an operation of at least one of the plurality of burners in response to at least one of the heated water temperatures.*

*25. A method of heating water using a heat exchanger, the method comprising:*

*providing a water circuit extending between a cold water inlet and a hot water outlet, the water circuit having a first section extending from the cold water inlet and a second section extending to the hot water outlet;*

*conducting water first through the first section and subsequently through the second section;*

*generating flue gases with a burner;*

*transferring heat from the flue gases to the second section to heat water being conducted through the second section;*

*transferring heat from the flue gases to the first section to heat water being conducted through the first section; and*

*recirculating a recirculated portion of the water from the hot water outlet to flow through the second section but not through the first section;*

*operating the burner at a first heat input rate while conducting water through the first section at a first flow rate to achieve a first heat exchanger thermal efficiency; and*

*operating the burner at a second heat input rate lower than the first heat input rate while conducting water through the first section at a second flow rate lower than the first flow rate to achieve a second heat exchanger thermal efficiency;*

*wherein conducting the water first through the first section and subsequently through the second section comprises flowing the water through the first section at a first flow velocity and flowing the water combined with the recirculated portion of the water through the second section at a second flow velocity greater than the first flow velocity; and*

*wherein the second heat input rate is no more than 15% of the first heat input rate and the second heat exchanger thermal efficiency is at least 99% of the first heat exchanger thermal efficiency.*

*26. The method of claim 25, further comprising maintaining the second flow velocity above a minimum velocity necessary to prevent scale formation in the second section while operating the burner at the second heat input rate.*

*27. The method of claim 25, wherein transferring heat from the flue gases to the first section comprises flowing the flue gases countercurrent to a flow direction of the water being conducted through the first section.*

*28. The method of claim 25, wherein the water circuit is one of a plurality of water circuits, further comprising:*

*delivering cold water in parallel to the cold water inlets of the plurality of water circuits; and*

*receiving heated water in parallel from the hot water outlets of the plurality of water circuits.*

*29. The method of claim 28, further comprising:*

*providing a plurality of hot water outlet valves, each of the plurality of hot water outlet valves being in fluid communication with the hot water outlet of a corresponding one of the plurality of water circuits; and*

*placing each one of the plurality of hot water outlet valves into an open position in order to receive the heated water in parallel from the hot water outlets of the plurality of water circuits.*

*30. The method of claim 28, wherein the burner is one of plurality of burners, each of the plurality of burners corresponding to one of the plurality of water circuits, further comprising:*

*measuring a heated water temperature from each one of the plurality of water circuits; and*

*modulating an operation of at least one of the plurality of burners in response to at least one of the heated water temperatures.*

* * * * *